UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

HALOGEN DERIVATIVE OF ANTHRAQUINONE AND PROCESS OF MAKING SAME.

SPECIFICATION forming part of Letters Patent No. 631,606, dated August 22, 1899.

Application filed April 12, 1899. Serial No. 712,763. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Halogen Derivatives of Alphylated Amido-Anthraquinones, (for which application for patent was made in Germany, No. B 23,556, October 15, 1898,) of which the following is a specification.

It is known that if 1.5-di-ortho-nitro-anthraquinone be boiled with analin a product is obtained which crystallizes in deep-red needles and dissolves in hot alcohol, giving a purple solution. (See Römer, *Berichte of the German Chemical Society*, Vol. 16, page 363.) If, on the one hand, other primary aromatic amins be used instead of anilin, or, on the other hand, isomeric di-nitro-anthraquinones be employed, analogous compounds are obtained, and these appear to be chemically alphylated amido-anthraquinones. For the sake of convenience I give below an example of the method by which these alphylated di-amido-anthraquinones can be obtained, but my invention consists in converting the said alphylated-amido-anthraquinones into halogen derivatives—namely, bromin or chlorin derivatives. The bromin derivatives are obtained by treating the alphylated amido-anthraquinones in a suitable solvent with an excess of bromin. The chlorin derivatives are obtained in a similar way, but using chlorin.

The essential characteristic of my new products, these halogen derivatives of alphylated amido-anthraquinones, is that the halogens in the molecule possess a very high capacity for entering into reactions, and consequently the new compounds are susceptible of treatment in various ways to yield new products, many of which are valuable coloring-matters.

The following examples will serve to further illustrate the manner in which my invention can be carried into practical effect. The parts are by weight.

*Example 1: Production of alphylated amido-anthraquinone from 1.5-dinitro-anthraquinone.*—Mix together about ten parts of 1.5-dinitro-anthraquinone and one hundred (100) parts of anilin. Heat the mixture for from three to four hours, so that it boils. A vigorous reaction takes place at first, but the heating is continued until this has left off. Allow the mixture to cool. The alphylated amido-anthraquinone crystallizes out. Work up in any suitable way. Instead of using the pure 1.5-dinitro-anthraquinone in the above example crude dinitro-anthraquinone, obtained by nitrating anthraquinone, can be employed, and in an analogous manner the isolated isomeric dinitro-anthraquinones can be used when the corresponding alphylated amido-anthraquinones are obtained.

*Example 2: Production of a new bromin derivative from the alphylated amido-anthraquinone obtained from 1.5-dinitro-anthraquinone and anilin.*—Dissolve about ten (10) parts of the alphylated amido-anthraquinone obtained according to the above example in about six hundred (600) parts of carbon bisulfid. Heat the mixture to facilitate solution. Then add about twenty (20) parts of bromin, and boil the mixture till no further evolution of hydro-bromic-acid can be noticed. Distil off the carbon bisulfid until only about one hundred and fifty (150) parts remain and dilute the residue with about five hundred (500) parts of alcohol. The new bromin derivative separates as a crystalline precipitate. Filter and dry.

*Example 3: Production of a new bromin derivative from the alphylated amido-anthraquinone obtained from 1.5-dinitro-anthraquinone and para-toluidin.*—Suspend about ten (10) parts of the said alphylated amido-anthraquinone in about one hundred (100) parts of glacial acetic acid and add at the ordinary temperature twenty (20) parts of bromin. Stir the mixture thoroughly and warm gently for some time. Allow to cool. The bromin derivative separates out. Collect by filtering.

*Example 4: Production of new chlorin derivatives of the alphylated amido-anthraquinone from 1.5-dinitro-anthraquinone and anilin.*—Make a suspension of about ten (10) parts of the said alphylated amido-anthraquinone in about one hundred (100) parts of glacial acetic acid and treat the mixture at the ordinary temperature with gaseous chlorin until the evolution of hydrochloric acid ceases. Allow the mixture to stand for about twelve hours. A portion of the product of reaction (Product A) separates out. This generally contains some unchanged alphylated product. The solution that remains contains higher chlorinated derivatives of the alphylated product, (Product B.) Collect the separated chlorinated product by filtering, and to the filtrate add water to precipitate the higher chlorinated product. Collect this in the usual way.

In the following table I describe the properties of various halogen derivatives obtained by treating the various alphylated amido-anthraquinones herein indicated in the manner described in the above examples. These are all mixtures of various highly-substituted halogen derivatives. They all possess the characteristic property that on treatment with aromatic amins they are converted into valuable coloring-matters, which in the form of their sulfoacids dye unmordanted or chrome-mordanted wool, giving valuable green shades. The production of these green coloring-matters forms the subject-matter of a separate application for Letters Patent of even date herewith, filed April 12, 1899, Serial No. 712,762. The further properties of my new halogen derivatives of the alphylated amido-anthraquinones can be seen from the table referred to.

| | Color of the powder. | Solution in alcohol. | | Solution in glacial acetic acid. | | Solution in benzene. | Solution in concentrated sulfuric acid. |
|---|---|---|---|---|---|---|---|
| | | Cold. | Hot. | Cold. | Hot. | | |
| Bromin derivative from condensation product of 1.5-dinitro-anthraquinone and anilin. | Violet to red brown. | Hardly soluble. Crimson red. | Somewhat more soluble. Crimson red. | Rather soluble. Crimson red. | Easily soluble. Crimson red. | Readily soluble. Crimson red. | Olive green. |
| Bromin derivative from condensation product of 1.3-dinitro-anthraquinone and anilin. | Dark violet | Slightly soluble. Cherry red. | Rather soluble. Cherry red. | Readily soluble. Violet red. | Readily soluble. Violet red. | Readily soluble. Intense violet red. | Dirty-gray brown. |
| Bromin derivative from condensation product of 1.8-dinitro-anthraquinone and anilin. | Violet | Difficultly soluble. Crimson red. | Somewhat more easily soluble. Crimson red. | Rather easily soluble. Cherry red. | Rather easily soluble. Cherry red. | Readily soluble. Cherry red. | Olive green. |
| Bromin derivative from condensation product of 1.5-dinitro-anthraquinone and para-toluidin. | Brick red | Insoluble. Yellow red. | Hardly soluble. Yellow red. | Rather difficultly soluble. Crimson red. | Rather easily soluble. Crimson red. | Readily soluble. Crimson red. | Yellow brown. |
| Bromin derivative from condensation product of 1.5-dinitro-anthraquinone and ortho-toluidin. | Violet brown | Slightly soluble. Crimson red. | Somewhat soluble. Crimson red. | ....do...... | ....do...... | ....do...... | Brownish olive. |
| Bromin derivative from condensation product of 1.5-dinitro-anthraquinone and benzidin. | Gray violet | Almost insoluble. Violet. | Only slightly soluble. Violet. | Slightly soluble. Red violet. | Rather soluble. Red violet. | Soluble. Cherry red. | Olive brown. |
| Bromin derivative from condensation product of 1.5-dinitro-anthraquinone and alpha-naphthylamin. | Red brown | Almost insoluble. | Hardly soluble, with reddish color. | Very slightly soluble. Red brown. | Slightly soluble. Red brown. | Rather soluble. Brownish red. | Dirty violet. |
| Chlorin derivative from condensation product of 1.5-dinitro-anthraquinone and anilin. Product A. | Violet brown | Rather easily soluble. Cherry red. | Easily soluble. Cherry red. | Rather soluble. Cherry red. | Easily soluble. Cherry red. | Readily soluble. Cherry red. | Discolored brownish. |
| Chlorin derivative from condensation product of 1.4'-dinitro-anthraquinone and anilin. Product B. | Pale brick red | Readily soluble. Yellow brown. | Readily soluble. Yellow brown. | Readily soluble. Yellow brown with reddish cast. | Readily soluble. Yellow brown with reddish cast. | Readily soluble. Red brown. | Yellow brown. |

I would remark with reference to the nomenclature adopted in this specification that by 1.8-dinitro-anthraquinone I mean that one which corresponds to chrysazine and by 1.3-dinitro-anthraquinone I mean that body which corresponds to xanthopurpurine.

Now what I claim is—

1. The process for the production of new halogen derivatives of alphylated diamido-anthraquinones by treating them with the herein-described halogens in the presence of a solvent herein described.

2. As a new article of manufacture the halogen derivatives of alphylated amido-anthraquinones which can be obtained from the herein-described halogens and alphylated amido-anthraquinones and which are soluble in benzene, and on heating with analin are converted into a green coloring-matter, all substantially as described.

In testimony whereof I have hereunto set my hand in the presence of two subscribing witnesses.

OSCAR BALLY.

Witnesses:
ERNEST F. EHRHARDT,
J. L. HEINKE.